(12) United States Patent
Suzuki

(10) Patent No.: US 8,065,519 B2
(45) Date of Patent: Nov. 22, 2011

(54) WIRELESS COMMUNICATION SYSTEM, TERMINAL, METHOD FOR REPORTING STATUS OF TERMINAL, AND PROGRAM

(75) Inventor: Hideyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 1082 days.

(21) Appl. No.: 11/499,804

(22) Filed: Aug. 7, 2006

(65) Prior Publication Data

US 2007/0036359 A1 Feb. 15, 2007

(30) Foreign Application Priority Data

Aug. 9, 2005 (JP) ................................. 2005-230261
Jul. 10, 2006 (JP) ................................. 2006-188745

(51) Int. Cl.
*H04L 29/06* (2006.01)

(52) U.S. Cl. ........................ 713/158; 713/168; 380/258

(58) Field of Classification Search .................. 713/158, 713/168; 380/258; 726/2, 3, 14; 455/411, 455/433, 435.1
See application file for complete search history.

(56) References Cited

U.S. PATENT DOCUMENTS

| 2002/0162004 | A1* | 10/2002 | Gunter et al. ................. 713/182 |
| 2004/0073672 | A1* | 4/2004 | Fascenda ....................... 709/225 |
| 2004/0157584 | A1* | 8/2004 | Bensimon et al. ............. 455/411 |

FOREIGN PATENT DOCUMENTS

| JP | 2004-159298 | 6/2004 |
| JP | 2004-199349 | 7/2004 |
| JP | 2004-260803 | 9/2004 |

* cited by examiner

*Primary Examiner* — Taghi Arani
*Assistant Examiner* — Justin T Darrow
(74) *Attorney, Agent, or Firm* — Finnegan, Henderson, Farabow, Garrett & Dunner, L.L.P.

(57) ABSTRACT

A wireless communication system includes a plurality of terminals connected to at least one wireless network on the basis of authority of security configuration parameters shared by the plurality of terminals. Each of the plurality of terminals revokes security configuration parameters of the terminal itself or security configuration parameters of another terminal in accordance with an agreement with said another terminal.

12 Claims, 13 Drawing Sheets

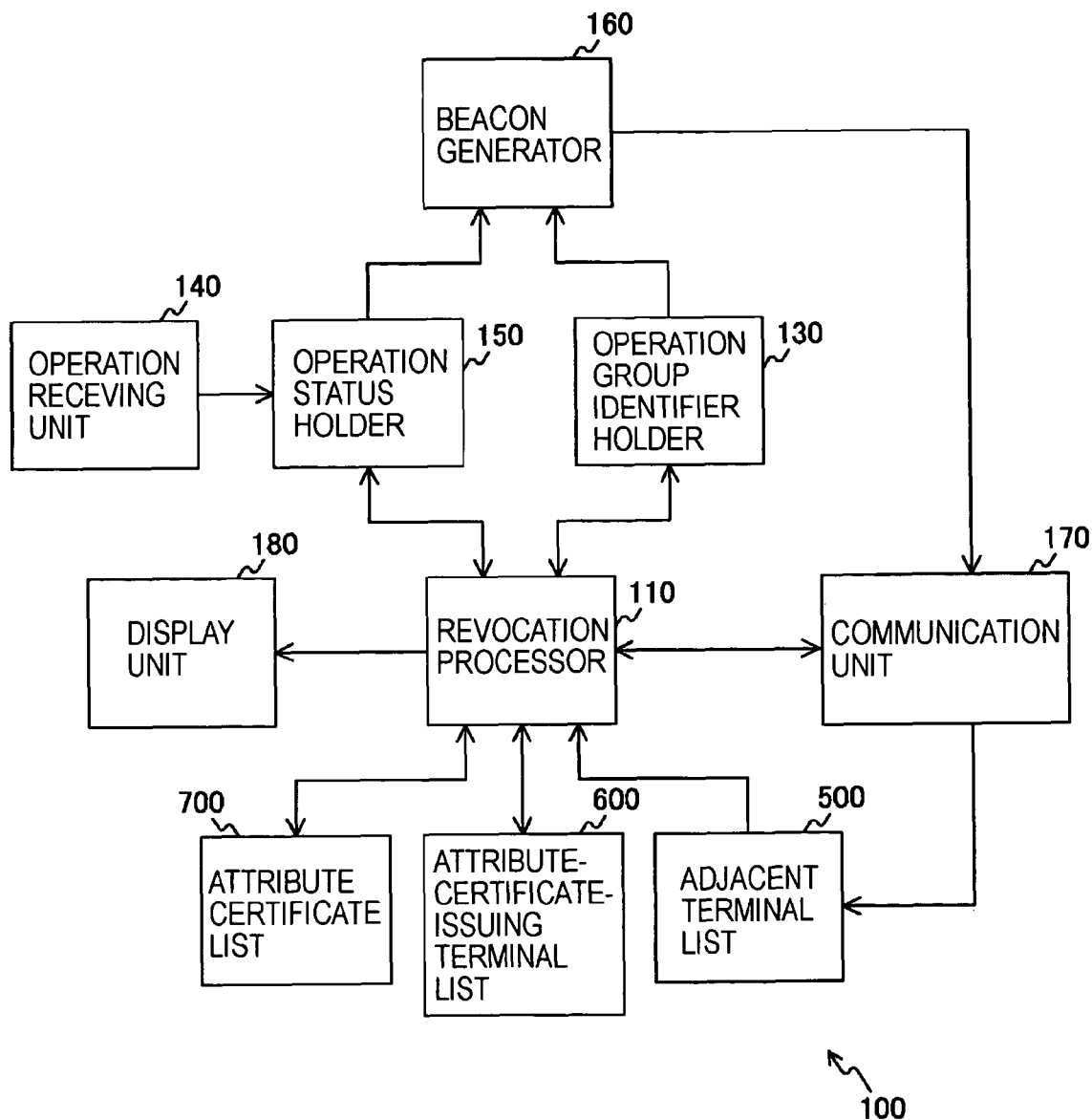

FIG. 4

| INDEX | TERMINAL IDENTIFIER | OPERATION GROUP IDENTIFIER | | REVOCATION OPERATION MODE |
| --- | --- | --- | --- | --- |
| | | NETWORK IDENTIFIER | PROFILE IDENTIFIER | |
| #1 | TERMINAL C | TERMINAL A | 1 | OFF |
| #2 | TERMINAL D | TERMINAL C | 1 | OFF |
| #3 | TERMINAL B | TERMINAL B | 2 | OFF |

FIG. 5

| INDEX | ISSUING TERMINAL GROUP IDENTIFIER | | ISSUING TERMINAL PUBLIC KEY CERTIFICATE | AUTHENTICATION GROUP IDENTIFIER | |
|---|---|---|---|---|---|
| 601 | 602 | | 605 | 606 | |
| | NETWORK IDENTIFIER | PROFILE IDENTIFIER | | NETWORK IDENTIFIER | PROFILE IDENTIFIER |
| #0 | TERMINAL B | 0 | PKC (TERMINAL B) | TERMINAL B | 0 |
| #1 | TERMINAL B | 1 | PKC (TERMINAL B) | TERMINAL B | 1 |
| #2 | TERMINAL B | 2 | PKC (TERMINAL B) | TERMINAL B | 2 |
| #3 | TERMINAL D | 1 | PKC (TERMINAL D) | TERMINAL B | 2 |

| INDEX | ISSUING TERMINAL GROUP IDENTIFIER | | ATTRIBUTE CERTIFICATE |
|---|---|---|---|
| | NETWORK IDENTIFIER | PROFILE IDENTIFIER | |
| #1 | TERMINAL B | 1 | AC (TERMINAL B, TERMINAL B, 1) |
| #2 | TERMINAL B | 2 | AC (TERMINAL B, TERMINAL B, 2) |

WIRELESS COMMUNICATION SYSTEM, TERMINAL, METHOD FOR REPORTING STATUS OF TERMINAL, AND PROGRAM

CROSS REFERENCES TO RELATED APPLICATIONS

The present invention contains subject matter related to Japanese Patent Application JP 2005-230261 filed in the Japanese Patent Office on Aug. 9, 2005 and Japanese Patent Application JP 2006-188745 filed in the Japanese Patent Office on Jul. 10, 2006, the entire contents of which are incorporated herein by reference.

BACKGROUND OF THE INVENTION

1. Field of the Invention

The present invention relates to wireless communication systems, and more particularly, to a wireless communication system that authenticates the authority of access to a wireless network by using security configuration parameters, such as an attribute certificate, a terminal used in the wireless communication system, a method for reporting the status of the terminal, and a program for causing a computer to execute the method for reporting the status of the terminal.

2. Description of the Related Art

Due to miniaturization and improvement in performance of electronic apparatuses, it has become easier to carry and use such electronic apparatuses. Thus, an environment that allows a terminal to be connected to a network and to achieve communication at any place necessary has been desired. In such a situation, wireless communication systems utilizing wireless communication are adopted.

In wireless communication systems, in order to prevent access from a terminal that does not have an authority of connection with a certain network resource, authorization control utilizing attribute certificates (ACs) is performed. Attribute certificates were newly defined by the X.509 version 3 in March 2000, and the contents of data fields contained in attribute certificates were collectively defined as Standards-Track Request for Comments (RFC) in April 2002. The use of an attribute certificate as an access pass to a network resource enables confirmation of the authority of connection with the network resource, and connection permission can be granted only to a terminal holding a connection license.

In order to forcibly revoke an issued attribute certificate, an attribute-certificate revocation list has been used. For example, a system utilizing an attribute-certificate revocation list including an entry, which is a pair of an attribute certificate identifier and a revocation time, has been suggested, for example, in Japanese Unexamined Patent Application Publication No. 2004-260803 (FIG. 1).

SUMMARY OF THE INVENTION

In the above-described known technology, when an attribute certificate is used as security configuration parameters, an attribute-certificate revocation list is used to revoke the attribute certificate. However, such an attribute-certificate revocation list is indirect. Thus, a terminal refers to the attribute-certificate revocation list every time the terminal receives an authentication request from another terminal.

In addition, in a wireless ad-hoc network or the like that does not include a server controlling an attribute-certificate revocation list, it is necessary to provide a mechanism for issuing attribute-certificate revocation lists autonomously in a decentralized fashion and for distributing the attribute-certificate revocation lists to terminals on the wireless network. In this case, due to instability of the ad-hoc network, the attribute-certificate revocation lists may not be successfully distributed to the terminals. This may cause a problem in which intended revocation of an attribute certificate is delayed.

In general, a procedure for directly deleting security configuration parameters, such as an attribute certificate, on a setting screen is available. However, if users who are not familiar with systems perform this procedure, they may have trouble with complicated processing steps. In addition, this procedure is not adoptable for terminals not provided with an output device, such as a display.

It is desirable to provide a mechanism for directly revoking security configuration parameters, such as an attribute certificate, on the basis of mutual agreement with another terminal.

A wireless communication system according to a first embodiment of the present invention includes a plurality of terminals connected to at least one wireless network on the basis of authority of security configuration parameters, such as an attribute certificate, shared by the plurality of terminals. Each of the plurality of terminals revokes security configuration parameters, such as an attribute certificate, of the terminal itself or security configuration parameters, such as an attribute certificate, of another terminal in accordance with an agreement with the another terminal. Thus, a wireless terminal revokes security configuration parameters, such as an attribute certificate, in accordance with an agreement with another wireless terminal.

A wireless communication system according to a second embodiment of the present invention includes a plurality of terminals that includes a first terminal and a second terminal and that is connected to at least one wireless network on the basis of authority of security configuration parameters, such as an attribute certificate, shared by the plurality of terminals. Each of the first terminal and the second terminal includes operation status holding means for holding information on whether or not an operation status of the terminal itself has entered a revocation operation mode, and operation receiving means for shifting a mode of the terminal itself so that the operation status holding means indicates the revocation operation mode when receiving an operation for causing the terminal itself to enter the revocation operation mode. The first terminal includes report signal receiving means for receiving a report signal indicating whether or not the second terminal has entered the revocation operation mode, and revocation request transmitting means for transmitting to the second terminal a revocation request for requesting revocation of the security configuration parameters, such as an attribute certificate, of the second terminal when the report signal receiving means receives the report signal indicating that the second terminal entered the revocation operation mode within a predetermined period of time from the transition of the operation status of the first terminal to the revocation operation mode. The second terminal includes revocation request receiving means for receiving from the first terminal the revocation request for requesting revocation of the security configuration parameters, such as an attribute certificate, of the second terminal, and revocation executing means for revoking the security configuration parameters, such as an attribute certificate, of the second terminal when the revocation request receiving means receives the revocation request when the second terminal has entered the revocation operation mode. Thus, the first terminal, which first enters the revocation operation mode, transmits a revocation request, and the second terminal, which receives the revocation request, revokes security configuration parameters, such as an attribute certificate, currently being used by the second terminal.

A terminal according to a third embodiment of the present invention used in a wireless communication system in which a plurality of terminals is connected to at least one wireless network on the basis of authority of security configuration parameters, such as an attribute certificate, shared by the plurality of terminals includes operation status holding means for holding information on whether or not an operation status of the terminal has entered a revocation operation mode; operation receiving means for shifting a mode of the terminal so that the operation status holding means indicates the revocation operation mode when receiving an operation for causing the terminal to enter the revocation operation mode; report signal receiving means for receiving a report signal indicating whether or not another terminal has entered the revocation operation mode; revocation request transmitting means for transmitting to the another terminal a revocation request for requesting, revocation of the security configuration parameters, such as an attribute certificate, of the another terminal when the report signal receiving means receives the report signal indicating that the another terminal entered the revocation operation mode within a predetermined period of time from the transition of the operation status of the terminal held in the operation status holding means to the revocation operation mode; revocation request receiving means for receiving from the another terminal a revocation request for requesting revocation of the security configuration parameters, such as an attribute certificate, of the terminal; and revocation processing means for revoking the security configuration parameters, such as an attribute certificate, of the terminal when the revocation request receiving means receives from the another terminal the revocation request for requesting revocation of the security configuration parameters, such as an attribute certificate, of the terminal when the terminal has entered the revocation operation mode. As described above, when the terminal entered the revocation operation mode before transition of the another terminal to the revocation operation mode, the terminal transmits a revocation request. In addition, when the terminal entered the revocation operation mode after transition of the another terminal to the revocation operation mode, the terminal receives a revocation request from the another terminal and revokes security configuration parameters, such as an attribute certificate, currently being used by the terminal.

A terminal according to a fourth embodiment of the present invention used in a wireless communication system in which a plurality of terminals is connected to at least one wireless network on the basis of authority of security configuration parameters, such as an attribute certificate, shared by the plurality of terminals includes operation status holding means for holding information on whether or not an operation status of the terminal has entered a revocation operation mode; operation receiving means for shifting a mode of the terminal so that the operation status holding means indicates the revocation operation mode when receiving an operation for causing the terminal to enter the revocation operation mode; report signal receiving means for receiving a report signal indicating whether or not another terminal has entered the revocation operation mode; and revocation processing means for transmitting to the another terminal a revocation request for requesting revocation of the security configuration parameters, such as an attribute certificate, of the another terminal when the report signal receiving means receives the report signal indicating that the another terminal entered the revocation operation mode within a predetermined period of time from the transition of the operation status of the terminal held in the operation status holding means to the revocation operation mode. Thus, the terminal, which entered the revocation operation mode before the transition of the another terminal to the revocation operation mode, transmits a revocation request for requesting revocation of security configuration parameters, such as an attribute certificate, of the another terminal.

In addition, in this embodiment, the revocation processing means may check the position of the another terminal before transmitting the revocation request and may transmit the revocation request only when the another terminal is located within a predetermined range. Thus, a revocation request not intended by a user can be prevented from being transmitted.

In addition, in this embodiment, when an acknowledgment for the revocation request is not received from the another terminal within the predetermined period of time from the transition of the terminal to the revocation operation mode, the revocation processing means may indicate information indicating that revocation on the another terminal has been unsuccessfully performed. Thus, the fact that revocation of security configuration parameters, such as an attribute certificate, has not been completed can be reported to the user.

In addition, in this embodiment, the operation receiving means may include a push button. This push button, that is, a revoke button, may be a single-purpose button for achieving a revocation operation mode. Alternatively, the revoke button may be a multi-purpose button. Thus, the present invention can be applied to a portable apparatus including a simple user interface.

A terminal according to a fifth embodiment of the present invention used in a wireless communication system in which a plurality of terminals is connected to at least one wireless network on the basis of authority of security configuration parameters, such as an attribute certificate, shared by the plurality of terminals includes operation status holding means for holding information on whether or not an operation status of the terminal has entered a revocation operation mode; operation receiving means for shifting a mode of the terminal so that the operation status holding means indicates the revocation operation mode when receiving an operation for causing the terminal to enter the revocation operation mode; revocation request receiving means for receiving from another terminal a revocation request for requesting revocation of the security configuration parameters, such as an attribute certificate, of the terminal; and revocation processing means for revoking the security configuration parameters, such as an attribute certificate, of the terminal when the revocation request receiving means receives from the another terminal the revocation request for requesting revocation of the security configuration parameters, such as an attribute certificate, of the terminal when the terminal has entered the revocation operation mode. Thus, the terminal, which entered the revocation operation mode after the transition of the another terminal to the revocation operation mode, receives a revocation request, and revokes security configuration parameters, such as an attribute certificate, of the terminal.

In addition, in the fifth embodiment, the revocation processing means may check the position of the another terminal before revoking the security configuration parameters, such as an attribute certificate, of the terminal and may revoke the security configuration parameters, such as an attribute certificate, of the terminal only when the another terminal is located within a predetermined range. Thus, revocation of security configuration parameters, such as an attribute certificate, not intended by a user can be prevented.

In addition, in the fifth embodiment, after revoking the security configuration parameters, such as an attribute certificate, of the terminal in response to the revocation request, the revocation processing means may transmit to the another terminal a revocation acknowledgment indicating that the security configuration parameters, such as an attribute certificate, of the terminal have been revoked. Thus, the fact that revocation of security configuration parameters, such as an attribute certificate, has been completed can be reported to the another terminal, which transmitted the revocation request.

In addition, in the fifth embodiment, the operation receiving means may include a push button. Thus, the present invention can be applied to a portable apparatus including a simple user interface.

A terminal control method or a program for causing a computer to execute processing according to a sixth embodiment of the present invention in a wireless communication system in which a plurality of terminals is connected to at least one wireless network on the basis of authority of security configuration parameters, such as an attribute certificate, shared by the plurality of terminals includes the steps of causing a terminal to enter a revocation operation mode; receiving a report signal indicating whether or not another terminal has entered the revocation operation mode; and transmitting to the another terminal a revocation request for requesting revocation of the security configuration parameters, such as an attribute certificate, of the another terminal when report signal receiving means receives the report signal indicating that the another terminal entered the revocation operation mode within a predetermined period of time from the transition of the operation status of the terminal held in operation status holding means to the revocation operation mode. Thus, when the terminal entered the revocation operation mode before transition of the another terminal to the revocation operation mode, the terminal transmits a revocation request. In addition, when the terminal entered the revocation operation mode after the transition of the another terminal to the revocation operation mode, the terminal receives a revocation request from the another terminal and revokes security configuration parameters, such as an attribute certificate, currently being used by the terminal.

Accordingly, on a wireless network, a terminal is capable of directly revoking shared security configuration parameters in accordance with a mutual agreement with another terminal.

BRIEF DESCRIPTION OF THE DRAWINGS

FIG. 2 shows an example of the functional configuration of a wireless terminal in the embodiment;

FIG. 4 shows an example of the configuration of an adjacent terminal list used in the embodiment;

FIG. 5 shows an example of the configuration of an attribute-certificate-issuing terminal list used in the embodiment;

FIG. 7 shows an example of the configuration of an attribute certificate list used in the embodiment;

DESCRIPTION OF THE PREFERRED EMBODIMENTS

Embodiments in which an attribute certificate is used as security configuration parameters will now be described as examples with reference to the drawings.

Figure 1A:
FIGS. 1A, 1B, and 1C shows examples of the connection relationship between wireless terminals in a wireless communication system according to an embodiment of the present invention.
Figure 1B:
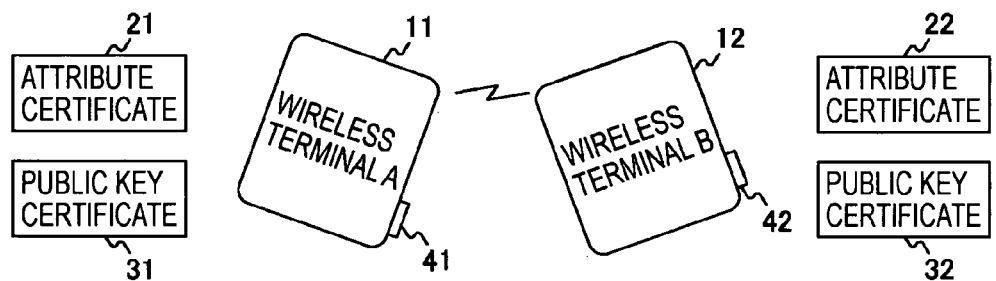
Figure 1C:

FIGS. 1A to 1C show examples of the connection relationship between wireless terminals in a wireless communication system according to an embodiment of the present invention. Referring to FIG. 1A, a wireless terminal A (11) and a wireless terminal B (12) are connected to a wireless network in accordance with their authorities based on attribute certificates 21 and 22, respectively. The wireless terminal A includes a public key certificate 31, and the wireless terminal B includes a public key certificate 32. The public key certificates 31 and 32 include public keys for verifying attribute certificates 21 and 22, respectively.

The wireless terminal A is provided with a revoke button 41, and the wireless terminal B is provided with a revoke button 42. When the wireless terminals A and B are placed in a predetermined positional relationship, as shown in FIG. 1B, if the revoke buttons 41 and 42 are pressed, the wireless terminals A and B enter a revocation operation mode. For example, the predetermined positional relationship is achieved by bringing the wireless terminals A and B close to each other with a distance of about 10 cm therebetween or by causing the wireless terminals A and B to direct directional infrared rays to each other. When the revoke buttons 41 and 42 are pressed in such a positional relationship, it is recognized that the wireless terminals A and B agree to execute a revocation operation. Thus, one of the wireless terminals A and B, which have entered the revocation operation mode, transmits a revocation request for requesting revocation of an attribute certificate to the other one of the wireless terminals A and B. The other one of the wireless terminals A and B receives the revocation request, revokes the attribute certificate, and transmits a revocation acknowledgement.

For example, a case where a wireless terminal that first entered the revocation operation mode transmits a revocation request is considered. When the wireless terminal A first entered the revocation operation mode, the wireless terminal A transmits a revocation request to the wireless terminal B. Thus, as shown in FIG. 1C, the wireless terminal B revokes the attribute certificate 22 and the public key certificate 32. As a result, the wireless terminal B is disconnected from the wireless network formed by the wireless terminal A and the wireless terminal B.

A case where two wireless terminals enter the revocation operation mode has been described above. However, when three or more wireless terminals enter the revocation operation mode, a process similar to a revocation process performed between two wireless terminals can be performed by specifying a destination terminal in accordance with a positional relationship. For example, after a wireless terminal A enters the revocation operation mode, wireless terminals B and C also enter the revocation operation mode. In this case, the wireless terminal A checks the positional relationship between the wireless terminals A, B, and C. Then, for example, the wireless terminal A transmits a revocation request to a wireless terminal that is located closest to the wireless terminal A. Here, the positional relationship is not necessarily based on distance. The positional relationship may be based on predetermined positions realized by causing terminals to direct directional infrared rays to each other.

FIG. 2 shows an example of the functional configuration of a wireless terminal 100 according to this embodiment. Referring to FIG. 2, the wireless terminal 100 includes a revocation processor 110, an operation group identifier holder 130, an operation receiving unit 140, an operation status holder 150, a beacon generator 160, a communication unit 170, a display unit 180, an adjacent terminal list 500, an attribute-certificate-issuing terminal list 600, and an attribute certificate list 700.

The revocation processor 110 performs a revocation process for revoking an attribute certificate with other wireless terminals. In this embodiment, a wireless terminal has two modes, a revocation operation mode in which a revocation process is performed and a normal mode in which other operations are performed. One of two wireless terminals that first enters the revocation operation mode serves as a revocation-requesting terminal (Revoker), which requests revocation of an attribute certificate of the other one of the wireless terminals, and the other one of the wireless terminals that next enters the revocation operation mode serves as a terminal subjected to revocation (Revokee), which is requested to revoke its attribute certificate. In this case, the revocation processor 110 performs processing for requesting revocation of an attribute certificate and processing for revoking the attribute certificate and transmitting a revocation acknowledgement.

The operation group identifier holder 130 holds a group identifier indicated in a beacon as a group identifier of a network group in which the wireless terminal 100 is operating. A group identifier is an identifier for identifying a network group on a wireless network. In this embodiment, a single wireless network is not necessarily used. An independent plurality of network groups may be used. In this case, the operation group identifier holder 130 indicates, using a group identifier, a network group to which the wireless terminal 100 is connected.

The operation receiving unit 140 receives a user operation. The operation receiving unit 140 may include a revoke button for causing the wireless terminal 100 to enter the revocation operation mode. The revoke button may be an independent single-purpose button for causing the wireless terminal 100 to enter the revocation operation mode. Alternatively, the revoke button may be a multi-purpose button.

The operation status holder 150 holds information on whether or not the wireless terminal 100 is in the revocation operation mode. When the operation receiving unit 140 receives an operation for causing the wireless terminal 100 to enter the revocation operation mode, the operation status holder 150 holds information indicating that the wireless terminal 100 is in the revocation operation mode. When the wireless terminal 100 is released from the revocation operation mode by the revocation processor 110 after completion of a revocation process, the operation status holder 150 holds information indicating that the wireless terminal 100 is not in the revocation operation mode.

The beacon generator 160 generates a beacon including a group identifier held in the operation group identifier holder 130 and an operation status held in the operation status holder 150. Since beacons generated by the beacon generator 160 are regularly broadcasted to other wireless terminals by the communication unit 170, the group identifier of a network group in which the wireless terminal 100 is operating and the operation status of the wireless terminal 100 are reported to the other wireless terminals.

The communication unit 170 performs wireless communication with other wireless terminals. For example, the communication unit 170 transmits beacons generated by the beacon generator 160 to other wireless terminals, and receives beacons from other wireless terminals. In addition, the communication unit 170 performs communication necessary for processing performed by the revocation processor 110 with other wireless terminals.

The display unit 180 displays information indicating that processing by the revocation processor 110 has been unsuccessfully performed. The display unit 180 may have a simple configuration as long as determination of whether or not processing has been successfully performed can be seen from the outside.

The adjacent terminal list 500 is a list including wireless terminals located adjacent to the wireless terminal 100. The attribute-certificate-issuing terminal list 600 is a list including information on issuing terminals that have issued attribute certificates to the wireless terminal 100. The attribute certificate list 700 is a list including attribute certificates owned by the wireless terminal 100. The adjacent terminal list 500, the attribute-certificate-issuing terminal list 600, and the attribute certificate list 700 will be described in more detail later.

Figure 3:
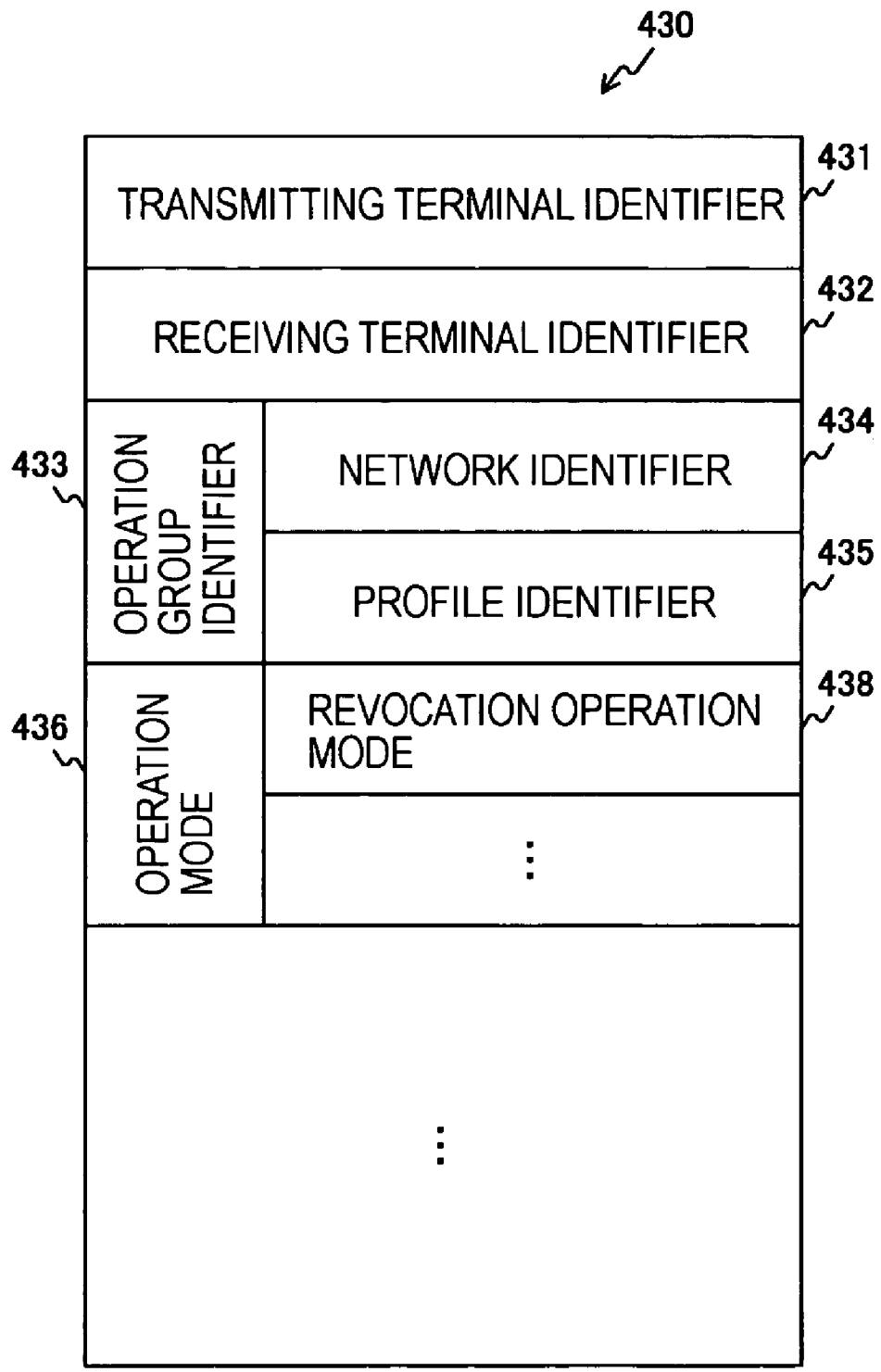
FIG. 3 shows an example of the frame configuration of a beacon used in the embodiment.

FIG. 3 shows an example of the frame structure of a beacon 430 used in this embodiment. The beacon 430 is regularly transmitted by the communication unit 170. The beacon 430 includes a transmitting terminal identifier 431, a receiving terminal identifier 432, an operation group identifier 433, and an operation mode 436.

The transmitting terminal identifier 431 indicates a terminal identifier of a transmitting terminal. The receiving terminal identifier 432 indicates a terminal identifier of a receiving terminal. In the beacon 430, a broadcast address is used as the receiving terminal identifier 432.

The operation group identifier 433 indicates a group identifier held in the operation group identifier holder 130 of a transmitting terminal. The operation group identifier 433 includes a network identifier 434 and a profile identifier 435. A terminal identifier of an issuing terminal that issues an attribute certificate for connection with a corresponding network group is used as the network identifier 434. A serial number set for an issuing terminal that issues a corresponding attribute certificate is used as the profile identifier 435. Thus, a network group can be uniquely identified.

The operation mode 436 indicates the operation status of a transmitting terminal. For example, the operation mode 436 includes a revocation operation mode 438. A wireless terminal that receives the beacon 430 is capable of recognizing whether the transmitting terminal is in the "revocation operation mode" or in the "non-revocation operation mode" by referring to the revocation operation mode 438.

FIG. 4 shows an example of the configuration of the adjacent terminal list 500 used in this embodiment. The adjacent terminal list 500 holds information on adjacent terminals in corresponding entries in accordance with beacons received from other wireless terminals. The adjacent terminal list 500 includes an index 501, a terminal identifier 502, an operation group identifier 503, and a revocation operation mode 507.

The index 501 indicates a serial number added to each entry. The terminal identifier 502 indicates a terminal identifier of an adjacent terminal. The operation group identifier 503 indicates a group identifier of an adjacent terminal. The revocation operation mode 507 indicates whether or not an adjacent terminal is in the revocation operation mode. The adjacent terminal list 500 is updated every time the communication unit 170 receives a beacon from a wireless terminal, and is referred to when the revocation processor 110 performs a revocation process.

FIG. 5 shows an example of the configuration of the attribute-certificate-issuing terminal list 600 used in this embodiment. The attribute-certificate-issuing terminal list 600 holds information on issuing terminals that issue attribute certificates in corresponding entries. The attribute-certificate-issuing terminal list 600 includes an index 601, an issuing terminal group identifier 602, an issuing terminal public key certificate 605, and an authentication group identifier 606.

The index 601 indicates a serial number added to each entry. The issuing terminal group identifier 602 indicates a group identifier of an issuing terminal. An issuing terminal indicated by the issuing terminal group identifier 602 is treated as a "Trustworthy".

The issuing terminal public key certificate 605 holds a public key certificate (PKC) of an issuing terminal. The authentication group identifier 606 holds a group identifier of the wireless terminal 100 when an issuing terminal is added to the attribute-certificate-issuing terminal list 600 of the wireless terminal 100. A wireless terminal indicated by the authentication group identifier 606 is a wireless terminal that is trusted when an issuing terminal is added.

The attribute-certificate-issuing terminal list 600 is used for acquiring a group identifier and a public key of an issuing terminal when mutual authentication is performed. In addition, since the authentication group identifier 606 is provided, an appropriate attribute certificate can be retrieved even if an issuing terminal issues a plurality of attribute certificates.

Figure 6:
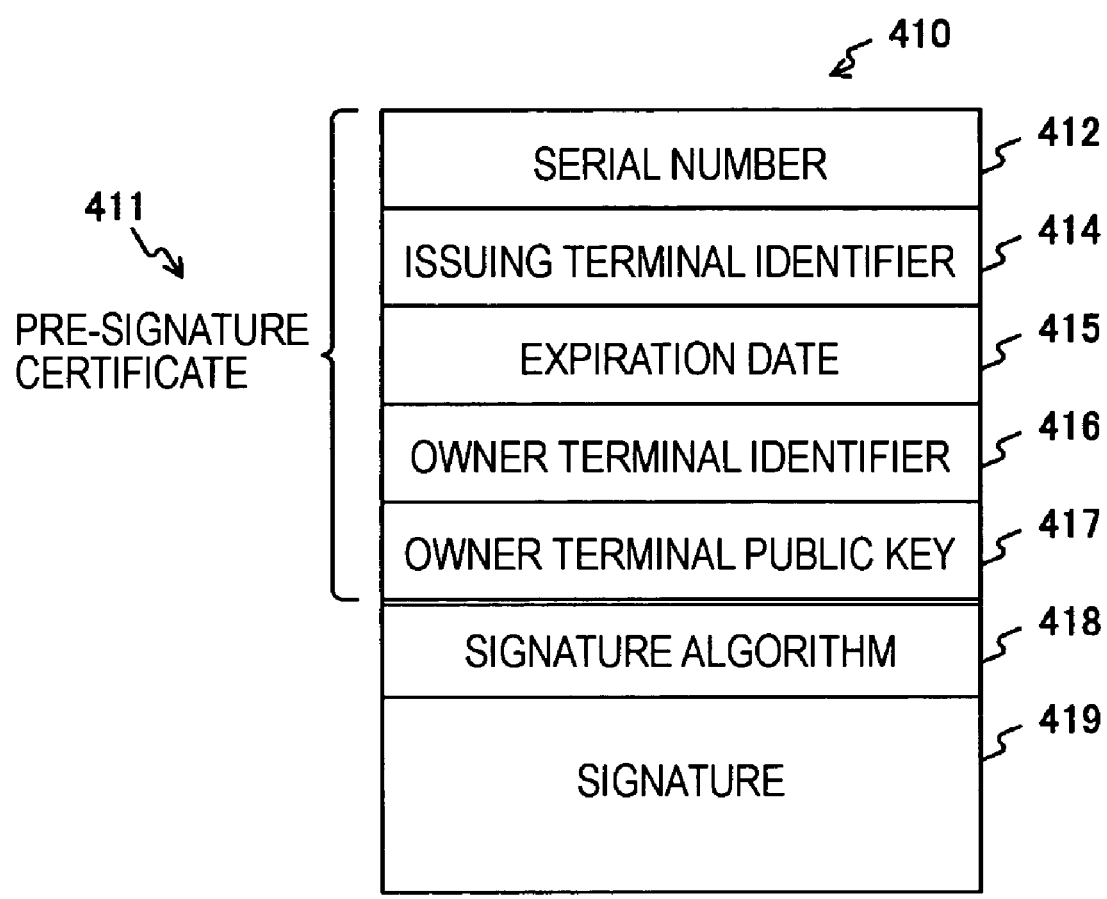
FIG. 6 shows an example of the configuration of a public key certificate held in the attribute-certificate issuing terminal list used in the embodiment.

FIG. 6 shows an example of the configuration of a public key certificate 410 held in the attribute-certificate-issuing terminal list 600 used in this embodiment. The public key certificate 410 mainly includes a pre-signature certificate 411, a signature algorithm 418, and a signature 419. The pre-signature certificate 411 includes a serial number 412, an issuing terminal identifier 414, an expiration date 415, an owner terminal identifier 416, and an owner terminal public key 417.

The serial number 412 indicates a serial number of the public key certificate 410. The serial number 412 is determined in accordance with an issuing terminal of the public key certificate 410. The issuing terminal identifier 414 is a terminal identifier of the issuing terminal of the public key certificate 410. The public key certificate 410 is uniquely identified in accordance with the issuing terminal identifier 414 and the serial number 412. The expiration date 415 indicates an expiration date of the public key certificate 410. The owner terminal identifier 416 is a terminal identifier of a terminal that owns the public key certificate 410. The owner terminal is a wireless terminal that receives an issued public key certificate, and a public key of the owner terminal is held as the owner terminal public key 417.

The signature 419 indicates a signature by the issuing terminal of the public key certificate 410. The signature algorithm 418 indicates a signature algorithm used for the signature 419. The signature algorithm 418 includes a message-digest algorithm and a public-key encryption algorithm. The message-digest algorithm is one of hash functions (digest functions) and is used for creating a message digest of the pre-signature certificate 411. A message digest is acquired by compressing input data (the pre-signature certificate 411) into a bit string of a fixed length and is called a thumb mark, a fingerprint, or the like. As the message digest algorithm, a secure hash algorithm 1 (SHA-1), a message digest #2 (MD2), a message digest #5 (MD5), and the like are known. The public key encryption algorithm is used for encrypting a message digest acquired by the message-digest algorithm in accordance with a private key of an issuing terminal of a public key certificate. As the public key encryption algorithm, a Rivest-Shamir-Adelman (RSA) algorithm based on a unique factorization problem, a digital signature algorithm (DSA) based on a discreet logarithm problem, and the like are known. As described above, the signature 419 is acquired by encrypting a message digest of the pre-signature certificate 411 using a private key of the issuing terminal that issues the public key certificate 410.

Thus, a message digest is acquired by decoding the signature 419 of the public key certificate 410 in accordance with a public key of the issuing terminal that issued the public key certificate 410. A user of the public key certificate 410 creates a message digest of the pre-signature certificate 411 and compares the message digest of the pre-signature certificate 411 with a message digest decoded in accordance with the public key of the issuing terminal that issued the public-key certificate 410. Thus, the user of the public key certificate 410 is able to verify that the contents of the pre-signature certificate 411 have not been altered.

FIG. 7 shows an example of the configuration of the attribute certificate list 700 used in this embodiment. The attribute certificate list 700 holds attribute certificates issued to the wireless terminal 100 in corresponding entries. The attribute certificate list 700 includes an index 701, an issuing terminal group identifier 702, and an attribute certificate 705.

The index 701 is a serial number added to each entry. The issuing terminal group identifier 702 indicates a group identifier of an issuing terminal that issues an attribute certificate. The attribute certificate 705 indicates an attribute certificate issued by an issuing terminal to the wireless terminal 100. The attribute certificate 705 included in the attribute certificate list 700 indicates the authority granted to the wireless terminal 100 to access to a network group.

Although a plurality of attribute-certificate-issuing terminals exists within a network group in the wireless communication system according to this embodiment, a wireless terminal that receives an attribute certificate issued by any one of the plurality of attribute-certificate-issuing terminals is capable of joining the network group. If a wireless terminal joins a plurality of different network groups and receives attribute certificates issued by network groups, a plurality of entries exists in the attribute certificate list 700.

Figure 8:
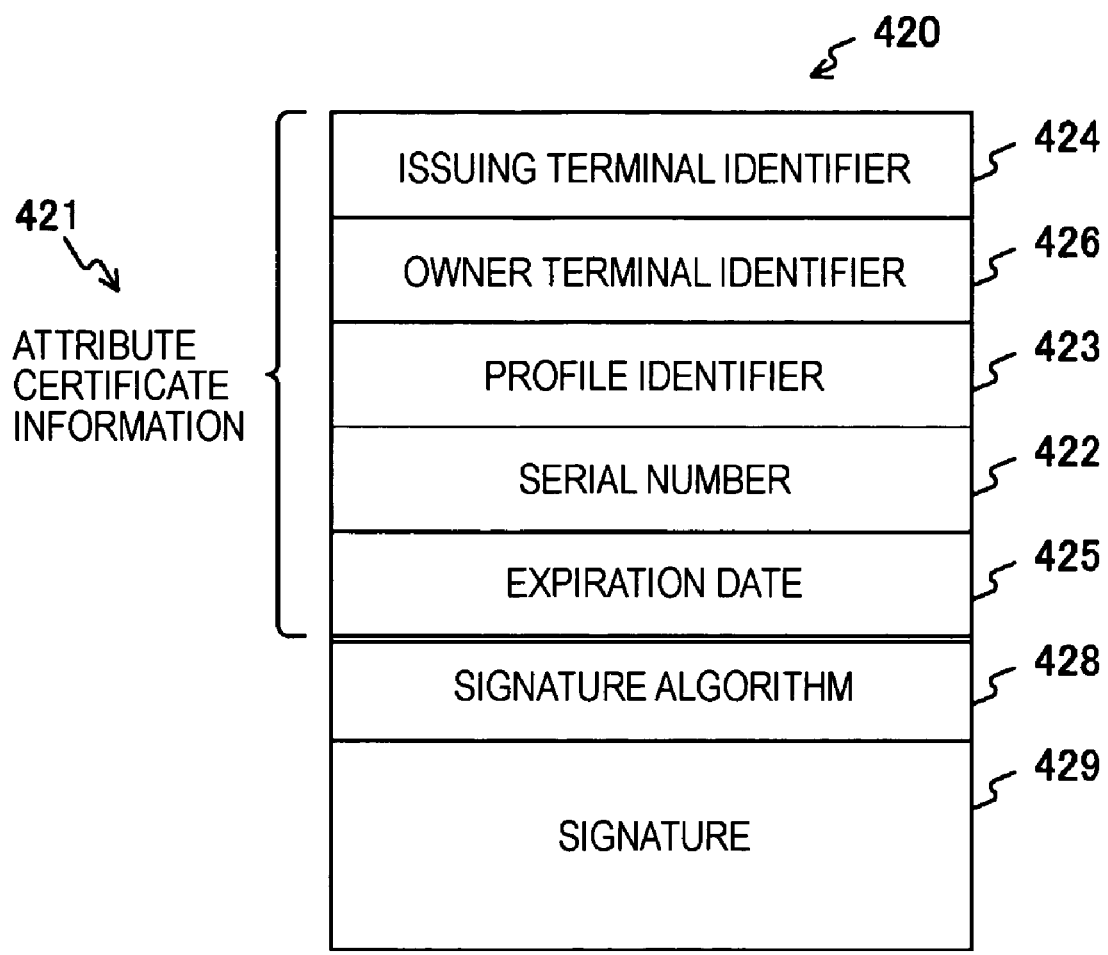
FIG. 8 shows an example of the configuration of an attribute certificate held in the attribute certificate list used in the embodiment.

FIG. 8 shows an example of the configuration of an attribute certificate 420 held in the attribute certificate list 700 used in this embodiment. The attribute certificate 420 mainly includes attribute certificate information 421, a signature algorithm 428, and a signature 429. The attribute certificate information 421 includes an issuing terminal identifier 424, an owner terminal identifier 426, a profile identifier 423, a serial number 422, and an expiration date 425.

The issuing terminal identifier 424 indicates a terminal identifier of an issuing terminal that issues the attribute certificate 420. The owner terminal identifier 426 indicates a terminal identifier of an owner terminal that owns the attribute certificate 420. The profile identifier 423 indicates a profile identifier of the issuing terminal that issues the attribute certificate 420. The serial number 422 indicates a serial number of the attribute certificate 420. The serial number 422 is determined in accordance with the issuing terminal of the attribute certificate 420. The attribute certificate 420 is uniquely identified in accordance with the serial number 422 and the issuing terminal identifier 424. The expiration date 425 indicates an expiration date of the attribute certificate 420.

The signature 429 indicates a signature of the issuing terminal of the attribute certificate 420. The signature algorithm 428 indicates a signature algorithm used for the signature 429. The contents of the signature algorithm 428 are similar to those of the signature algorithm 418 of the public key certificate 410, and the signature 429 is acquired by encrypting a message digest of the attribute certificate information 421 in accordance with a private key of the issuing terminal of the attribute certificate 420.

Thus, a message digest is acquired by decoding the signature 429 of the attribute certificate 420 in accordance with a public key of the issuing terminal of the attribute certificate 420. A user of the attribute certificate 420 creates a message digest of the attribute certificate information 421 and compares the message digest with a message digest acquired by decoding the signature 429 of the attribute certificate 420 in accordance with the public key of the issuing terminal of the attribute certificate 420. Thus, the user is able to verify that the contents of the attribute certificate information 421 have not been altered.

The operation of the wireless terminal 100 in this embodiment is described next with reference to FIGS. 9 and 10.

Figure 9:
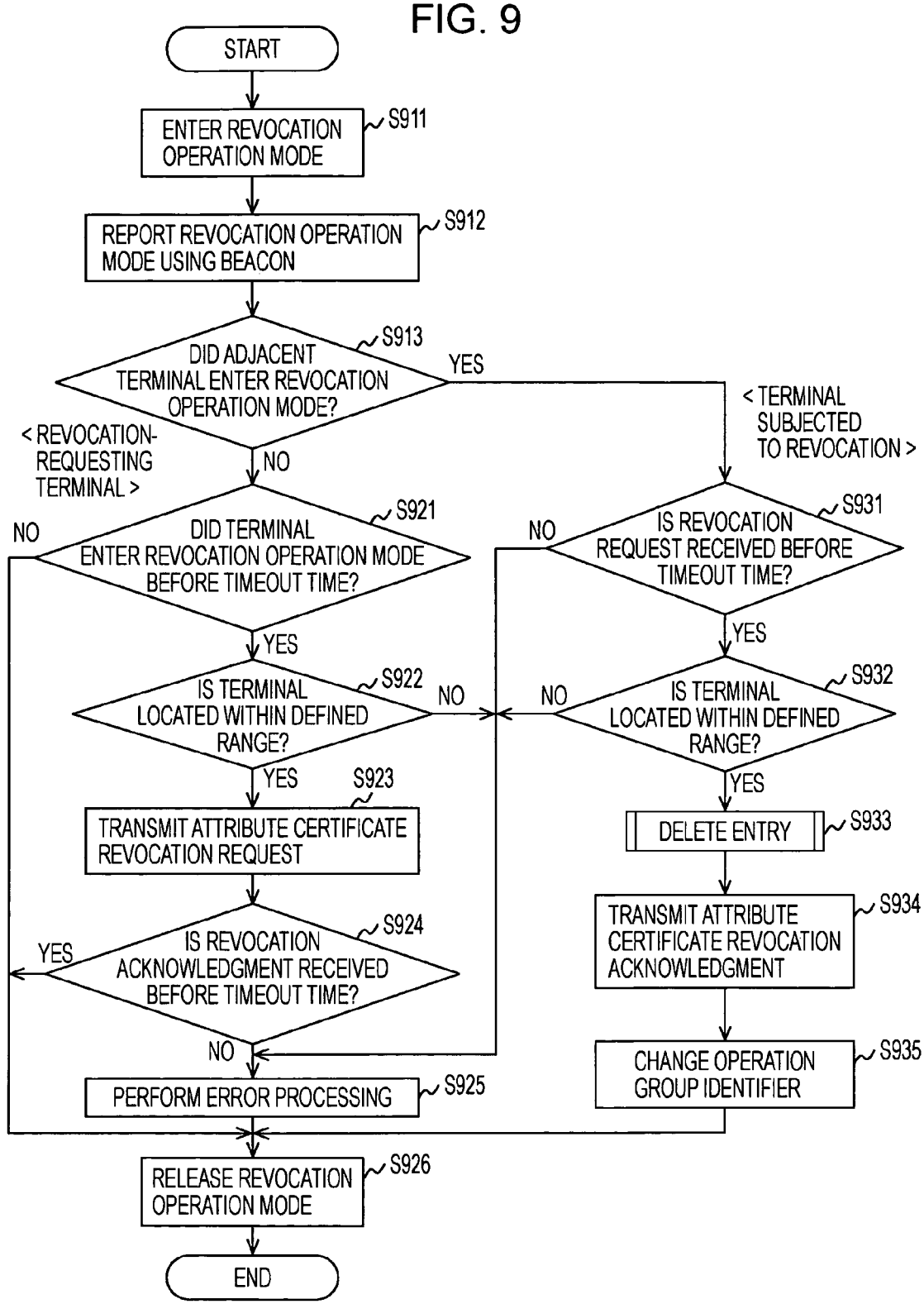
FIG. 9 is a flowchart of a process performed by the wireless terminal in the embodiment.

FIG. 9 is a flowchart of a process performed by the wireless terminal 100 in this embodiment. When the operation receiving unit 140 receives an operation for causing the wireless terminal 100 to enter the revocation operation mode in response to depression of a revoke button or the like, the operation status held in the operation status holder 150 is changed to the revocation operation mode (step S911). The beacon generator 160 generates a beacon including the operation status, and the communication unit 170 reports the operation status as a beacon to another wireless terminal (step S912).

It is determined whether or not a wireless terminal adjacent to the wireless terminal 100 entered the revocation operation mode before the transition of the wireless terminal 100 to the revocation operation mode (step S913). If it is determined in step S913 that no adjacent wireless terminal entered the revocation operation mode before the transition of the wireless terminal 100 to the revocation operation mode, it is determined whether or not a wireless terminal adjacent to the wireless terminal 100 entered the revocation operation mode within a predetermined period of time from the transition of the wireless terminal 100 to the revocation operation mode to the timeout time (step S921). If it is determined in step S921 that no adjacent wireless terminal entered the revocation operation mode within the predetermined period of time from the transition of the wireless terminal 100 to the revocation operation mode to the timeout time, since no wireless terminal whose attribute certificate is to be revoked exists, the revocation operation mode is released (step S926).

If it is determined in step S921 that an adjacent wireless terminal entered the revocation operation mode within the predetermined period of time from the transition of the wireless terminal 100 to the revocation operation mode to the timeout time, the revocation processor 110 determines whether or not the wireless terminal is located within a defined range (step S922). In this determination processing, the revocation processor 110 may calculate a distance in accordance with the time and radio field intensity necessary for communication with the wireless terminal and may determine whether or not the distance is within the defined range. Alternatively, the revocation processor 110 may specify a positional relationship using directional signals, such as infrared rays, and may determine whether or not the position is within the defined range. If it is determined in step S922 that the wireless terminal is not located within the defined range, error processing in which, for example, the fact that revocation has not been successfully performed is indicated on the display unit 180 is performed (step S925). Then, the revocation operation mode is released (step S926).

If it is determined in step S922 that the wireless terminal is located within the defined range, the revocation processor 110 transmits a revocation request for requesting the wireless terminal to revoke an attribute certificate (step S923). Then, it is determined whether or not a revocation acknowledgment indicating that the attribute certificate has been revoked is received from the wireless terminal within the predetermined period of time from the transition of the wireless terminal 100 to the revocation operation mode to the timeout time (step S924). If it is determined in step S924 that a revocation acknowledgment is received from the wireless terminal within the predetermined period of time from the transition of the wireless terminal 100 to the revocation operation mode to the timeout time, since the revocation process has been successfully performed, the revocation operation mode is released (step S926). If it is determined in step S924 that a revocation acknowledgement is not received within the predetermined period of time before the timeout time, the error processing is performed (step S925). Then, the revocation operation mode is released (step S926).

If it is determined in step S913 that an adjacent wireless terminal entered the revocation operation mode before the transition of the wireless terminal 100 to the revocation operation mode, it is determined whether or not a revocation request is received within the predetermined period of time from the transition of the wireless terminal 100 to the revocation operation mode to the timeout time (step S931). If it is determined in step S931 that a revocation request is not received, since no wireless terminal that requests revocation of an attribute certificate exists, the error processing is performed (step S925). Then, the revocation operation mode is released (step S926).

If it is determined in step S931 that a revocation request is received within the predetermined period of time from the transition of the wireless terminal 100 to the revocation operation mode to the timeout time, the revocation processor 110 determines whether or not the wireless terminal that transmitted the revocation request is located within the defined range (step S932). In this determination processing, as described above, the revocation processor 110 may determine whether or not the wireless terminal is located within the defined range by calculating a distance or by using a directional signal. If it is determined in step S932 that the wireless terminal is not located within the defined range, the error processing is performed (step S925). Then, the revocation operation mode is released (step S926).

If it is determined in step S932 that the wireless terminal is located within the defined range, the revocation processor 110 deletes a corresponding entry in the attribute certificate list 700 and the attribute-certificate-issuing terminal list 600 (step S933). Then, the revocation processor 110 transmits a revocation acknowledgment to the wireless terminal from which the revocation request is received (step S934). Then, the revocation processor 110 selects an entry from among entries held in the attribute certificate list 700, and causes the operation group identifier holder 130 to hold a group identifier described as the issuing terminal group identifier 702 of the selected entry (step S935). Thus, the beacon generator 160 generates a beacon including a new group identifier.

After the above-described processing is completed, the revocation operation mode is released (step S926). In a beacon after the revocation operation mode is released, the revocation operation mode 438 of the operation mode 436 indicates "not in the revocation operation mode". Thus, when a wireless terminal whose operation group identifier holder 130 holds a group identifier corresponding to the operation group identifier 433 receives the beacon, mutual authentication starts.

Figure 10:
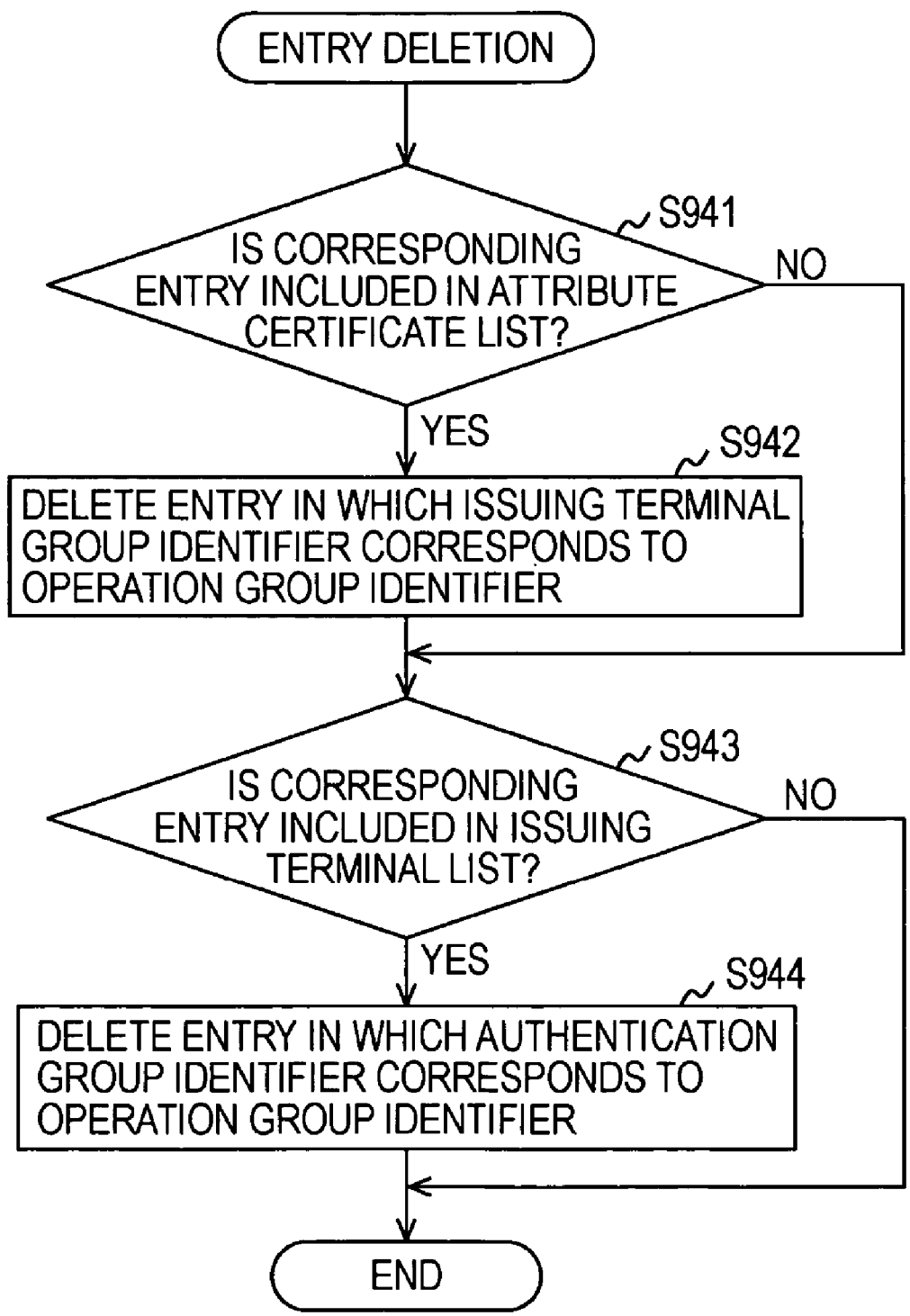
FIG. 10 is a flowchart of an entry deletion process in the embodiment.

FIG. 10 is a flowchart of an entry deletion process in this embodiment. If it is determined in step S932 in FIG. 9 that the wireless terminal from which the revocation request is received is located within the defined range, the revocation processor 110 determines whether or not an entry in which the issuing terminal group identifier 702 of the attribute certificate list 700 corresponds to a group identifier held in the operation group identifier holder 130 (step S941) exists. If it is determined in step S941 that a corresponding entry exists, the entry is deleted (step S942). Thus, a corresponding attribute certificate is deleted.

The revocation processor 110 determines whether or not an entry in which the authentication group identifier 606 in the attribute-certificate-issuing terminal list 600 corresponds to a group identifier held in the operation group identifier holder 130 exists (step S943). If it is determined in step S943 that a corresponding entry exists, the entry is deleted (step S944). Thus, a public key certificate used for verification of the deleted attribute certificate is also deleted.

An operation example of the wireless communication system according to this embodiment is described next with reference to FIG. 11.

Figure 11:
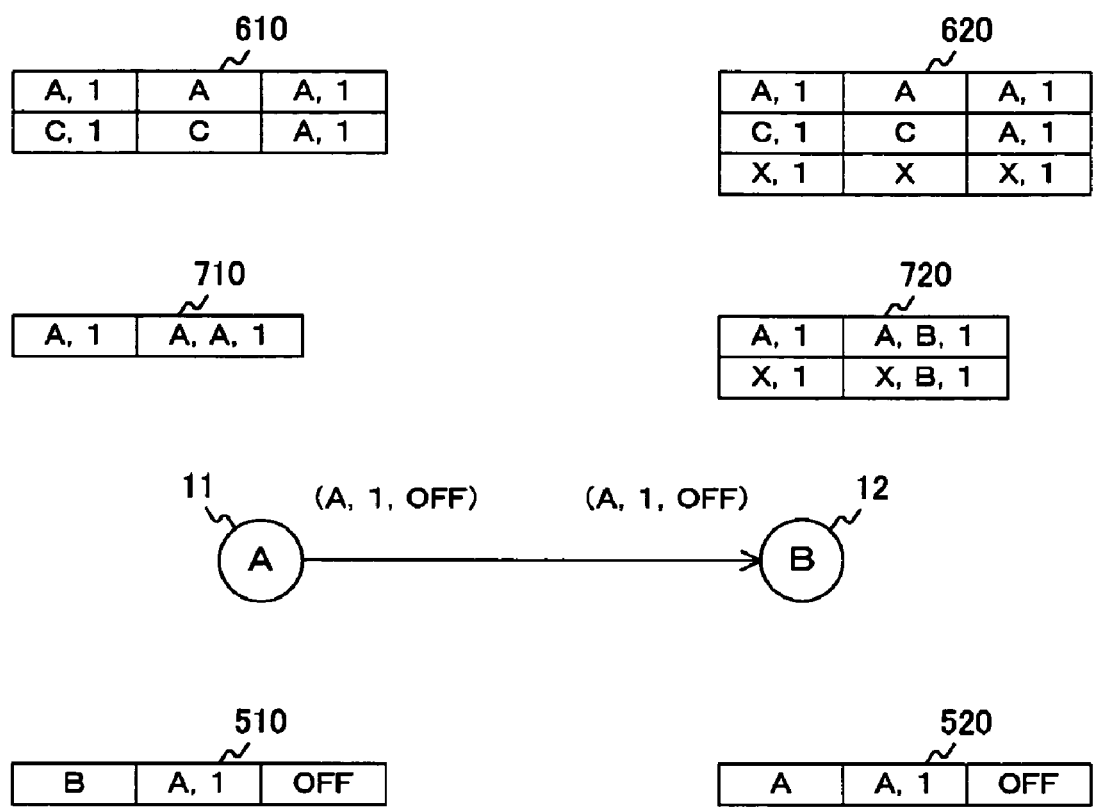
FIG. 11 shows an example of a connection state between wireless terminals in the wireless communication system according to the embodiment.

FIG. 11 shows an example of a connection state between the wireless terminals A and B in the wireless communication system according to this embodiment. In this connection state, the wireless terminals A and B form a network group in accordance with the authority of an attribute certificate issued by the wireless terminal A.

In this example, an attribute-certificate-issuing terminal list 610 represents the attribute-certificate-issuing terminal list 600 of the wireless terminal A, and an attribute-certificate-issuing terminal list 620 represents the attribute-certificate-issuing terminal list 600 of the wireless terminal B. In addition, an attribute certificate list 710 represents the attribute certificate list 700 of the wireless terminal A, and an attribute certificate list 720 represents the attribute certificate list 700 of the wireless terminal B. In addition, an adjacent terminal list 510 represents the adjacent terminal list 500 of the wireless terminal A, and an adjacent terminal list 520 represents the adjacent terminal list 500 of the wireless terminal B.

In this example, for example, the left column of the attribute-certificate-issuing terminal list 610 of the wireless terminal A corresponds to the issuing terminal group identifier 602 of the attribute-certificate-issuing terminal list 600, the center column of the attribute-certificate-issuing terminal list 610 corresponds to the owner terminal identifier 416 of the issuing terminal public key certificate 605 of the attribute-certificate-issuing terminal list 600, and the right column of the attribute-certificate-issuing terminal list 610 corresponds to the authentication group identifier 606 of the attribute-certificate-issuing terminal list 600. In addition, for example, the left column of the attribute certificate list 710 of the wireless terminal A corresponds to the issuing terminal group identifier 702 of the attribute certificate list 700, and the right column of the attribute certificate list 710 corresponds to the attribute certificate 705 of the attribute certificate list 700. In addition, for example, the left column of the adjacent terminal list 510 of the wireless terminal A corresponds to the wireless terminal identifier 502 of the adjacent terminal list 500, the center column of the adjacent terminal list 510 corresponds to the operation group identifier 503 of the adjacent terminal list 500, and the right column of the adjacent terminal list 510 corresponds to the revocation operation mode 507 of the adjacent terminal list 500.

The wireless terminal A owns an attribute certificate issued by the wireless terminal A and a public key certificate of the wireless terminal A that is necessary for verification of the attribute certificate. The wireless terminal A also owns a public key certificate of the wireless terminal C (not shown) that was acquired by exchange with the wireless terminal C. The operation group identifier holder 130 of the wireless terminal A holds a terminal identifier and a profile identifier "1" of the wireless terminal A. In addition, the operation status holder 150 of the wireless terminal A holds information (OFF) indicating that the wireless terminal A is not in the revocation operation mode. Such information is reported to adjacent terminals using a beacon. In this example, only the wireless terminal B is registered as an adjacent terminal that is adjacent to the wireless terminal A.

The wireless terminal B owns attribute certificates issued by the wireless terminal A and a wireless terminal X (not shown) and public key certificates of the wireless terminal A and the wireless terminal X that are necessary for verification of the attribute certificates. The wireless terminal B also owns a public key certificate of the wireless terminal C that was acquired by exchange with the wireless terminal A. Similar to the wireless terminal A, the operation group identifier holder 130 of the wireless terminal B holds a terminal identifier and a profile identifier "1" of the wireless terminal A, and the operation status holder 150 of the wireless terminal B holds information (OFF) indicating that the wireless terminal B is not in the revocation operation mode. Such information is reported to adjacent terminals using a beacon. In this example, only the wireless terminal A is registered as an adjacent terminal that is adjacent to the wireless terminal B.

Figure 12:
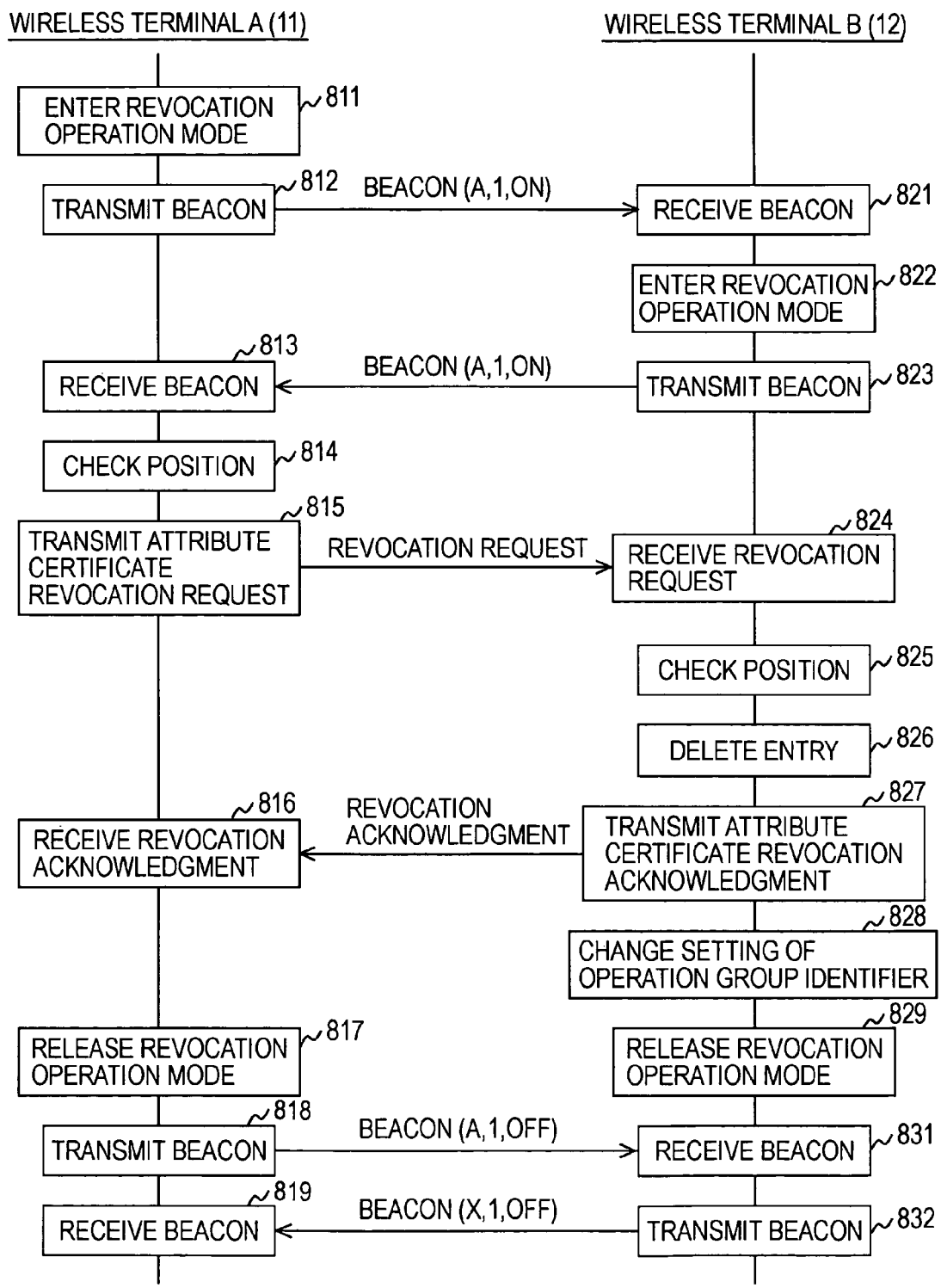
FIG. 12 is a sequence flow diagram showing a revocation process performed by the wireless terminals in the wireless communication system according to the embodiment.

FIG. 12 is a sequence flow diagram showing a revocation process performed by the wireless terminal A and the wireless terminal B in the wireless communication system according to this embodiment. When a revoke button or the like of the wireless terminal A is pressed, the wireless terminal A enters the revocation operation mode (step 811). The transition to the revocation operation mode is reflected in a beacon, and is reported to the wireless terminal B (step 812). The wireless terminal B receives the beacon (step 821). Thus, the wireless terminal B knows that the wireless terminal A has entered the revocation operation mode.

Then, when a revoke button or the like of the wireless terminal B is pressed, the wireless terminal B also enters the revocation operation mode (step 822). The transition to the revocation operation mode is reflected in a beacon, and is reported to the wireless terminal A (step 823). The wireless terminal A receives the beacon (step 813). Thus, the wireless terminal A knows that the wireless terminal B has entered the revocation operation mode.

The wireless terminal A knows that the wireless terminal B entered the revocation operation mode after the transition of the wireless terminal A to the revocation operation mode. Then, the wireless terminal A checks whether or not the wireless terminal B is located within a defined range (step 814). If the wireless terminal B is located within the defined range, the wireless terminal A transmits to the wireless terminal B a revocation request for requesting revocation of an attribute certificate (step 815).

The wireless terminal B receives the revocation request from the wireless terminal A (step 824), and checks whether or not the wireless terminal A is located within a defined range (step 825). If the wireless terminal A is located within the defined range, the wireless terminal B deletes a corresponding entry in each of the attribute certificate list 700 and the attribute-certificate-issuing terminal list 600 (step 826). More specifically, an entry including an attribute certificate issued by the wireless terminal A is deleted from the attribute certificate list 700, and entries including public key certificates of the wireless terminal A and the wireless terminal C are deleted from the attribute-certificate-issuing terminal list 600.

The wireless terminal B transmits a revocation acknowledgment to the wireless terminal A (step 827). Then, the wireless terminal B selects an entry of a wireless terminal X remaining in the attribute certificate list 720, and a group identifier of the wireless terminal X is set to the operation group identifier holder 130 (step 828).

Then, the wireless terminal B releases the revocation operation mode (step 829). The wireless terminal A receives the revocation acknowledgment from the wireless terminal B (step 816), and the wireless terminal A releases the revocation operation mode (step 817). Thus, beacons of the wireless terminals A and B indicate that the wireless terminals A and B are not in the revocation operation mode (steps 818, 831, 832, and 819). In addition, an operation group identifier of the beacon of the wireless terminal B is changed so as to include the terminal identifier of the wireless terminal X.

Figure 13:
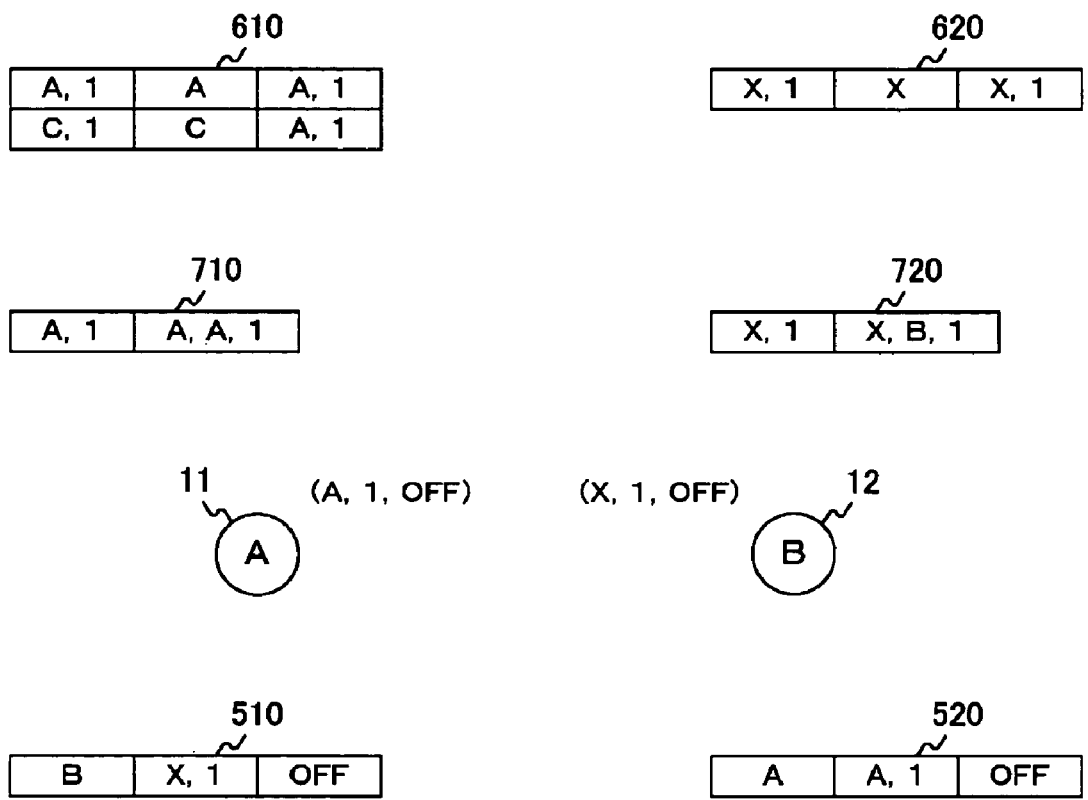
FIG. 13 shows an example of a state after the revocation process is performed by the wireless terminals in the wireless communication system according to the embodiment.

FIG. 13 shows an example of a state after the revocation process is performed by the wireless terminal A and the wireless terminal B in the wireless communication system according to this embodiment. Compared with the state shown in FIG. 11, an entry including an attribute certificate issued by the wireless terminal A is deleted from the attribute certificate list 700 (the attribute certificate list 720), and entries including public key certificates of the wireless terminal A and the wireless terminal C are deleted from the attribute-certificate-issuing terminal list 600 (the attribute-certificate-issuing terminal list 620).

Thus, according to this embodiment, since the operation receiving unit 140 of each of two wireless terminals receives an operation for revoking an attribute certificate, the revocation processor 110 of one of the wireless terminals transmits a revocation request, and the revocation processor 110 of the other one of the wireless terminals that receives the revocation request revokes the attribute certificate. A user may give an instruction using a revoke button or the like. Thus, the present invention can be applied to a portable apparatus including a simple user interface.

In the foregoing embodiment, one of two wireless terminals that first enters a revocation operation mode transmits a revocation request, and the other one of the wireless terminals that receives the revocation request revokes an attribute certificate. However, the present invention is not limited to this. One of wireless terminals that enters a revocation operation mode after transition of the other one of the wireless terminals to the revocation operation mode may transmit a revocation request, and the other one of the wireless terminals that receives the revocation request may revoke an attribute certificate. In addition, when a revoke button of a wireless terminal is pressed, the wireless terminal may delete an attribute certificate of the wireless terminal itself.

The foregoing embodiments are merely examples. Although the correspondence between features of claims and embodiments are described below, the present invention is not limited to the foregoing embodiments. Various changes can be made to the present invention without departing from the scope of the present invention.

That is, according to an embodiment of the present invention, a terminal corresponds to, for example, wireless terminals 11, 12, or 100.

According to another embodiment of the present invention, an operation status holder corresponds to, for example, the operation status holder 150. In addition, an operation receiving unit corresponds to, for example, the operation receiving unit 140. In addition, a report signal receiving unit and a revocation request receiving unit correspond to, for example, the communication unit 170. In addition, a revocation request transmitting unit and a revocation executing unit correspond to, for example, the revocation processor 110.

According to another embodiment of the present invention, an operation status holder corresponds to, for example, the operation status holder 150. In addition, an operation receiving unit corresponds to, for example, the operation receiving unit 140. In addition, a report signal receiving unit corresponds to, for example, the communication unit 170. In addition, a revocation processor corresponds to, for example, the revocation processor 110.

According to another embodiment of the present invention, an operation status holder corresponds to, for example, the operation status holder 150. In addition, an operation receiving unit corresponds to, for example, the operation receiving unit 140. In addition, a revocation request receiving unit corresponds to, for example, the communication unit 170. In addition, a revocation processor corresponds to, for example, the revocation processor 110.

According to another embodiment of the present invention, processing for causing a first terminal to enter a revocation operation mode corresponds to, for example, the processing of step S911. In addition, processing for receiving a report signal indicating whether or not a second terminal has entered the revocation operation mode corresponds to, for example, the processing of step S913. In addition, processing for transmitting to the second terminal a revocation request for requesting revocation of an attribute certificate of the second terminal when a report signal receiving unit receives the report signal indicating that the second terminal entered the revocation operation mode within a predetermined period of time from the transition of the operation status of the first terminal held in an operation status holder to the revocation operation mode corresponds to, for example, steps S921 and S923.

In the foregoing embodiments, a case where an attribute certificate is used as security configuration parameters has been described by way of example. However, security configuration parameters are not necessarily an attribute certificate. For example, security configuration parameters may be parameters used in a wireless system, such as the IEEE 802.11 wireless LAN, (for example, a pre-shared key, a public key certificate, a password, a personal identification number (PIN) code, or a network identifier, such as a service set ID (SSID)).

The processing steps described in the foregoing embodiments may be regarded as being a method including the processing steps. Alternatively, the processing steps may be regarded as being a program for causing a computer to execute the processing steps or may be regarded as being a recording medium that stores the program.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication system comprising:
a plurality of terminals that includes a first terminal and a second terminal and that is connected to at least one wireless network on the basis of authority of security configuration parameters shared by the plurality of terminals,
wherein each of the first terminal and the second terminal includes
operation status holding means for holding information on whether or not an operation status of the terminal itself has entered a revocation operation mode, and
operation receiving means for shifting a mode of the terminal itself so that the operation status holding means indicates the revocation operation mode when receiving an operation for causing the terminal itself to enter the revocation operation mode,
wherein the first terminal includes
report signal receiving means for receiving a report signal indicating whether or not the second terminal has entered the revocation operation mode, and
revocation request transmitting means for transmitting to the second terminal a revocation request for requesting revocation of the security configuration parameters of the second terminal when the report signal receiving means receives the report signal indicating that the second terminal entered the revocation operation mode within a predetermined period of time from the transition of the operation status of the first terminal to the revocation operation mode,
wherein the revocation request transmitting means checks the position of the second terminal before transmitting the revocation request and transmits the revocation request only when the second terminal is located within a predetermined range, and
wherein the second terminal includes
revocation request receiving means for receiving from the first terminal the revocation request for requesting revocation of the security configuration parameters of the second terminal, and
revocation executing means for revoking the security configuration parameters of the second terminal when the revocation request receiving means receives the revocation request when the second terminal has entered the revocation operation mode,
wherein the revocation executing means checks the position of the first terminal before revoking the security configuration parameters of the second terminal and revokes the security configuration parameters of the second terminal only when the first terminal is located within a predetermined range.

2. A terminal used in a wireless communication system in which a plurality of terminals is connected to at least one wireless network on the basis of authority of security configuration parameters shared by the plurality of terminals, comprising:
operation status holding means for holding information on whether or not an operation status of the terminal has entered a revocation operation mode;
operation receiving means for shifting a mode of the terminal so that the operation status holding means indicates the revocation operation mode when receiving an operation for causing the terminal to enter the revocation operation mode;
report signal receiving means for receiving a report signal indicating whether or not another terminal has entered the revocation operation mode;
revocation request transmitting means for transmitting to said another terminal a revocation request for requesting revocation of the security configuration parameters of said another terminal when the report signal receiving means receives the report signal indicating that said another terminal entered the revocation operation mode within a predetermined period of time from the transition of the operation status of the terminal held in the operation status holding means to the revocation operation mode;
revocation request receiving means for receiving from said another terminal a revocation request for requesting revocation of the security configuration parameters of the terminal; and
revocation processing means for revoking the security configuration parameters of the terminal when the revocation request receiving means receives from said another terminal the revocation request for requesting revocation of the security configuration parameters of the terminal when the terminal has entered the revocation operation mode,
wherein the revocation request transmitting means checks the position of said another terminal before transmitting the revocation request and transmits the revocation request only when said another terminal is located within a predetermined range, and
wherein the revocation processing means checks the position of said another terminal before revoking the security configuration parameters of the terminal and revokes the security configuration parameters of the terminal only when said another terminal is located within a predetermined range.

3. A terminal used in a wireless communication system in which a plurality of terminals is connected to at least one wireless network on the basis of authority of security configuration parameters shared by the plurality of terminals, comprising:
operation status holding means for holding information on whether or not an operation status of the terminal has entered a revocation operation mode;
operation receiving means for shifting a mode of the terminal so that the operation status holding means indicates the revocation operation mode when receiving an operation for causing the terminal to enter the revocation operation mode;
report signal receiving means for receiving a report signal indicating whether or not another terminal has entered the revocation operation mode; and
revocation processing means for transmitting to said another terminal a revocation request for requesting revocation of the security configuration parameters of said another terminal when the report signal receiving means receives the report signal indicating that said another terminal entered the revocation operation mode within a predetermined period of time from the transition of the operation status of the terminal held in the operation status holding means to the revocation operation mode,
wherein the revocation processing means checks the position of said another terminal before transmitting the revocation request and transmits the revocation request only when said another terminal is located within a predetermined range.

4. The terminal according to claim 3, wherein when an acknowledgment for the revocation request is not received from said another terminal within the predetermined period of time from the transition of the terminal to the revocation operation mode, the revocation processing means indicates information indicating that revocation on said another terminal has been unsuccessfully performed.

5. The terminal according to claim 3, wherein the operation receiving means includes a push button.

6. A terminal used in a wireless communication system in which a plurality of terminals is connected to at least one wireless network on the basis of authority of security configuration parameters shared by the plurality of terminals, comprising:
   operation status holding means for holding information on whether or not an operation status of the terminal has entered a revocation operation mode;
   operation receiving means for shifting a mode of the terminal so that the operation status holding means indicates the revocation operation mode when receiving an operation for causing the terminal to enter the revocation operation mode;
   revocation request receiving means for receiving from another terminal a revocation request for requesting revocation of the security configuration parameters of the terminal; and
   revocation processing means for revoking the security configuration parameters of the terminal when the revocation request receiving means receives from said another terminal the revocation request for requesting revocation of the security configuration parameters of the terminal when the terminal has entered the revocation operation mode,
   wherein the revocation processing means checks the position of said another terminal before revoking the security configuration parameters of the terminal and revokes the security configuration parameters of the terminal only when said another terminal is located within a predetermined range.

7. The terminal according to claim 6, wherein after revoking the security configuration parameters of the terminal in response to the revocation request, the revocation processing means transmits to said another terminal a revocation acknowledgment indicating that the security configuration parameters of the terminal have been revoked.

8. The terminal according to claim 6, wherein the operation receiving means includes a push button.

9. A wireless communication system comprising:
   a plurality of terminals that includes a first terminal and a second terminal and that is connected to at least one wireless network on the basis of authority of security configuration parameters shared by the plurality of terminals, wherein each of the first terminal and the second terminal includes
      an operation status holder that holds information on whether or not an operation status of the terminal itself has entered a revocation operation mode, and
      an operation receiving unit that shifts a mode of the terminal itself so that the operation status holder indicates the revocation operation mode when receiving an operation for causing the terminal itself to enter the revocation operation mode,
   wherein the first terminal includes
      a report signal receiving unit that receives a report signal indicating whether or not the second terminal has entered the revocation operation mode, and
      a revocation request transmitting unit that transmits to the second terminal a revocation request for requesting revocation of the security configuration parameters of the second terminal when the report signal receiving unit receives the report signal indicating that the second terminal entered the revocation operation mode within a predetermined period of time from the transition of the operation status of the first terminal to the revocation operation mode,
      wherein the revocation request transmitting unit checks the position of the second terminal before transmitting the revocation request and transmits the revocation request only when the second terminal is located within a predetermined range, and
   wherein the second terminal includes
      a revocation request receiving unit that receives from the first terminal the revocation request for requesting revocation of the security configuration parameters of the second terminal, and
      a revocation executing unit that revokes the security configuration parameters of the second terminal when the revocation request receiving unit receives the revocation request when the second terminal has entered the revocation operation mode,
      wherein the revocation executing unit checks the position of the first terminal before revoking the security configuration parameters of the second terminal and revokes the security configuration parameters of the second terminal only when the first terminal is located within a predetermined range.

10. A terminal used in a wireless communication system in which a plurality of terminals is connected to at least one wireless network on the basis of authority of security configuration parameters shared by the plurality of terminals, comprising:
    an operation status holder that holds information on whether or not an operation status of the terminal has entered a revocation operation mode;
    an operation receiving unit that shifts a mode of the terminal so that the operation status holder indicates the revocation operation mode when receiving an operation for causing the terminal to enter the revocation operation mode;
    a report signal receiving unit that receives a report signal indicating whether or not another terminal has entered the revocation operation mode;
    a revocation request transmitting unit that transmits to said another terminal a revocation request for requesting revocation of the security configuration parameters of said another terminal when the report signal receiving unit receives the report signal indicating that said another terminal entered the revocation operation mode within a predetermined period of time from the transition of the operation status of the terminal held in the operation status holder to the revocation operation mode;
    a revocation request receiving unit that receives from said another terminal a revocation request for requesting revocation of the security configuration parameters of the terminal; and
    a revocation processor that revokes the security configuration parameters of the terminal when the revocation request receiving unit receives from said another terminal the revocation request for requesting revocation of the security configuration parameters of the terminal when the terminal has entered the revocation operation mode, wherein the revocation request transmitting unit checks the position of said another terminal before transmitting the revocation request and transmits the revocation request only when said another terminal is located within a predetermined range, and wherein the revocation processor checks the position of said another terminal before revoking the security configuration parameters of the terminal and revokes the security configuration parameters of the terminal only when said another terminal is located within a predetermined range.

11. A terminal used in a wireless communication system in which a plurality of terminals is connected to at least one wireless network on the basis of authority of security configuration parameters shared by the plurality of terminals, comprising:

an operation status holder that holds information on whether or not an operation status of the terminal has entered a revocation operation mode;

an operation receiving unit that shifts a mode of the terminal so that the operation status holder indicates the revocation operation mode when receiving an operation for causing the terminal to enter the revocation operation mode;

a report signal receiving unit that receives a report signal indicating whether or not another terminal has entered the revocation operation mode; and a revocation processor that transmits to said another terminal a revocation request for requesting revocation of the security configuration parameters of said another terminal when the report signal receiving unit receives the report signal indicating that said another terminal entered the revocation operation mode within a predetermined period of time from the transition of the operation status of the terminal held in the operation status holder to the revocation operation mode, wherein the revocation processor checks the position of said another terminal before transmitting the revocation request and transmits the revocation request only when said another terminal is located within a predetermined range.

12. A terminal used in a wireless communication system in which a plurality of terminals is connected to at least one wireless network on the basis of authority of security configuration parameters shared by the plurality of terminals, comprising:

an operation status holder that holds information on whether or not an operation status of the terminal has entered a revocation operation mode;

an operation receiving unit that shifts a mode of the terminal so that the operation status holder indicates the revocation operation mode when receiving an operation for causing the terminal to enter the revocation operation mode;

a revocation request receiving unit that receives from another terminal a revocation request for requesting revocation of the security configuration parameters of the terminal; and a revocation processor that revokes the security configuration parameters of the terminal when the revocation request receiving unit receives from said another terminal the revocation request for requesting revocation of the security configuration parameters of the terminal when the terminal has entered the revocation operation mode, wherein the revocation processor checks the position of said another terminal before revoking the security configuration parameters of the terminal and revokes the security configuration parameters of the terminal only when said another terminal is located within a predetermined range.

* * * * *